United States Patent [19]

Bernhard et al.

[11] Patent Number: 4,494,993

[45] Date of Patent: Jan. 22, 1985

[54] NACREOUS PIGMENTS, THEIR PREPARATION AND USE

[75] Inventors: Horst Bernhard, Schwarzenberg, Austria; Reiner Esselborn, Darmstadt, Fed. Rep. of Germany

[73] Assignee: Merck Patent Gesellschaft mit beschrankter Haftung, Darmstadt, Fed. Rep. of Germany

[21] Appl. No.: 453,045

[22] Filed: Dec. 27, 1982

[30] Foreign Application Priority Data

Dec. 24, 1981 [DE] Fed. Rep. of Germany ....... 3151354

[51] Int. Cl.$^3$ .............................................. C09C 3/00
[52] U.S. Cl. .................................. 106/291; 106/309; 427/219
[58] Field of Search ..................... 106/291, 308 B, 309, 106/300; 427/214, 218, 219

[56] References Cited

U.S. PATENT DOCUMENTS

| | | | |
|---|---|---|---|
| 3,087,828 | 4/1963 | Linton | 106/291 |
| 3,087,829 | 4/1963 | Linton | 106/291 |
| 3,342,617 | 9/1967 | Jackson | 106/291 |
| 3,650,790 | 3/1972 | Klenke et al. | 106/291 |
| 3,711,308 | 1/1973 | Brand et al. | 106/291 |
| 3,832,208 | 7/1974 | Jackson | 106/308 Q |
| 3,926,659 | 12/1975 | Bernhard et al. | 106/291 |
| 4,134,776 | 1/1979 | Rieger et al. | 106/291 |

FOREIGN PATENT DOCUMENTS

| | | | |
|---|---|---|---|
| 2072300 | 9/1971 | France | 106/291 |
| 2193859 | 2/1974 | France | 106/300 |

*Primary Examiner*—G. L. Kaplan
*Attorney, Agent, or Firm*—Millen & White

[57] ABSTRACT

Nacreous pigments having improved transparency and tinctorial strength and based on mica flakes coated with metal oxides, have a metal oxide layer which is formed as a homogeneous mixed layer in which, in addition to titanium dioxide, there also is present silicon dioxide and aluminum oxide. These can be produced by coating mica in an aqueous suspension with a titanium dioxide hydrate layer and then washing, drying and calcining. Silicon dioxide and aluminum hydroxide are precipitated as a uniform layer together with the titanium dioxide hydrate. The new pigments can be used for pigmenting plastics, lacquers, paints and cosmetics, inter alia.

15 Claims, No Drawings

NACREOUS PIGMENTS, THEIR PREPARATION AND USE

BACKGROUND OF THE INVENTION

The present invention relates to nacreous pigments having improved transparency and tinctorial strength. These are based on mica flakes coated with metal oxides.

The tinctorial strength, that is the intensity and purity of the interference color of such pigments depend critically on the quality of the metal oxide layer precipitated onto the mica flakes. The main requirement is, in addition to a homogeneous thickness of the layer, that the layer be formed crack-free and scatter light to as small an extent as possible. Cracks can arise, in particular in the case of thicker layers, when the pigments are being calcined. Moreover, it is known that not only cracks, but also, in particular, the size of the metal oxide crystals precipitated onto the mica play a critical role in determining the extent of scattering.

It is also known that the degree of scattering within the layer within the region concerned is larger, the larger the size of the individual crystals of the metal oxide precipitated. The diffuse light formed at the scattering centers within the metal oxide layer not only reduces the intensity in the glancing angle of the reflected light fraction, and hence color saturation, but also causes whitening of the interference color. In the case of crystals which are too large, the pearlescent luster and the interference color disappear completely.

Pigments prepared by the known precipitation methods, where in particular $TiO_2$ is precipitated as a homogeneous layer onto mica flakes, are not yet satisfactory in respect of transparence and tinctorial strength.

SUMMARY OF THE INVENTION

Accordingly, it is an object of this invention to provide such pigments which are improved in respects discussed above, inter alia.

Upon further study of the specification and appended claims, further objects and advantages of this invention will become apparent to those skilled in the art.

It has now been found that, surprisingly, particularly advantageous pigments are obtained when the precipitation of the $TiO_2$ is carried out in the presence of aluminum ions and $SiO_2$ is co-precipitated at the same time. Thereby, pigments are obtained which have a homogeneous mixed layer in which, in addition to $TiO_2$, $SiO_2$ and $Al_2O_3$ are also present.

The present invention therefore relates to nacreous pigments having improved transparency and tinctorial strength which are based on mica flakes coated with metal oxides, and wherein the metal oxide layer is formed as a homogeneous mixed layer in which, in addition to titanium dioxide, silicon dioxide and aluminum oxide are also present.

This invention also relates to a process for preparing these pigments and to their use.

DETAILED DISCUSSION

The pigments of this invention have a number of advantages. The reduction in scattered light markedly improves the transparency and tinctorial strength of the pigments. Without intending to limit this invention in any way, this effect can be considered to be due at least partially to the size of the metal oxide crystals which are precipitated. Investigations with an electron microscope have shown that, in pigments according to this invention, these crystals are markedly smaller than in customary pigments. However, the addition of aluminum and silicate ions per this invention evidently also produces a more homogeneous and more stable precipitation, which is very much more reproducible than in customary precipitation methods. When the pigments are dispersed in water, it is found that very many fewer $TiO_2$ particles are dissolved from the pigment surface of the new pigments and solubilized.

In the preparation of pigments according to this invention, fully conventional processes can be used, such as, for example, the process described in German Pat. No. 2,009,566, whose disclosure is entirely incorporated by reference herein. All details of the process of this invention are in accordance with this disclosure except as indicated otherwise herein. In this process, mica flakes, which as a rule have a diameter of about 5-200 μm and a thickness of about 0.1-5 μm, are suspended in an aqueous solution which is adjusted to a pH value of about 0.5-5, in particular about 1.5-2.5, by means of a suitable acid, such as, for example, hydrochloric acid or sulfuric acid. This suspension is then heated to about 50°-100° C., preferably to about 70°-80° C., and a titanium salt solution is then slowly added. The pH value of the suspension is maintained at a largely constant value in the mentioned range by the simultaneous addition of a base. Any soluble titanium salt can be used as the titanium salt. $TiCl_4$ or titanyl sulfate is preferably used.

In the process according to this invention, this process is correspondingly modified in that the titanium dioxide hydrate is precipitated in the presence of aluminum ions. It is immaterial in this process whether the aluminum ions are initially introduced into the precipitation vessel or whether they are contained in the titanium salt solution. In principle, any aluminum salt can be used which is soluble in the corresponding titanium salt solutions. The aluminum salt preferably used in each case contains the anion which corresponds to the titanium salt; that is, in particular aluminum chloride or aluminum sulfate. The aluminum ions are added in each case in such amount that a ratio by weight of $TiCl_4$:$AlCl_3 \cdot 6 H_2O$ of about 50:1 to about 2:1, preferably about 30:1 to about 5:1, is maintained, with corresponding weight ratios, based on the relative amounts of Ti and Al, when other salts are used.

The $SiO_2$, which, according to the present invention is to be co-precipitated at the same time, is preferably added to the base which is metered into the precipitation suspension at the same time as the acidic titanium salt solution to maintain the pH value. The base preferably used is an alkali metal hydroxide solution, in particular NaOH, and the silicon dioxide to be co-precipitated is contained therein, preferably in the form of a soluble alkali metal silicate, for example as sodium silicate. If the base used is NaOH, the ratio by weight maintained of NaOH to $SiO_2$ is as a rule 5:1 to 400:1, preferably 20:1 to 200:1. Corresponding amounts of other bases will be used based on the difference in weight with respect to NaOH.

Of course, within the context of the above-mentioned relative weight range of aluminum and silicon, the amount of these two components added in the precipitation will be sufficient to achieve the desired content of Si and Al in the metal oxide layer. When necessary, precise amounts of aluminum- and silicon-containing ingredients can be easily determined using routine, fully conventional methods and considerations.

The two solutions are slowly added in such a way that the hydroxides or hydrated oxides formed by hydrolysis in the mica suspension in each case precipitate completely onto the mica surfaces without significant formation of amounts of by-products which are freely mobile in the suspension. The rates of addition used in this step are so chosen that, per minute and per square meter of surface area to be covered, about 0.01 to $20 \times 10^{-5}$ mole of salts to be precipitated are added. Depending on the desired thickness of the coating, the process requires coating times of several hours up to several days, precise times being routinely determinable using conventional considerations.

After the layer thickness desired, or the interference color desired, has been reached, the coating step is terminated, and the pigments, fully analogously to conventional processes, are separated off, washed, dried and calcined. The temperatures used for the calcination are about 500°–1,000° C., in particular 700°–1,000° C., and the metal hydroxides, or the hydrated oxides, are dehydrated and turn into the corresponding oxides.

Titanium, silicon and aluminum are present in homogeneous dispersion side by side in the metal oxide layer in oxidic form and, also possibly in the form of a compound, such as, for example, as aluminum silicate. The precise form will not be critical and will depend on the usual factors, such as the relative amount of each ingredient. In this layer, silicon, calculated as $SiO_2$ and relative to the total weight of the entire metal oxide layer, constitutes as a rule a proportion of about 0.1 to about 20 percent by weight, preferably of about 1 to about 10 percent by weight, and the aluminum, calculated as $Al_2O_3$ and relative to the total weight of the entire metal oxide layer, constitutes a proportion of about 0.1 to about 20 percent by weight, preferably of about 0.2 to about 10 percent by weight. $SiO_2$ and $Al_2O_3$ together constitute as a rule 0.2–30 percent by weight, preferably about 2–20 percent by weight, of the metal oxide layer.

Any interference color, of first or higher order, can be obtained by varying the thickness of the coating as is known conventionally. Even in the case of very thick layers, as required for preparing pigments having a blue or green interference color, crack formation, which leads to a reduction in luster, can hardly be observed at all. Overall, the pigments of this invention have a relatively high transparency, less scattered light and, against a dark background, a relatively high tinctorial strength. These advantages apply to pigments of any particle size, but they can be observed particularly significantly in the case of those particles where the scattering in the metal oxide layer is particularly troublesome, namely in pigments having a small particle size. It is thus possible, using the process of this invention, to prepare high-quality and intensely colored interference pigments even with mica particles below 10 μm in diameter.

Owing to the relatively large stability of the pigments upon dispersal in water, during which step fewer $TiO_2$ particles are dissolved from the pigment surface and solubilized, the new pigments are also of advantage in particular where further treatment in an aqueous suspension or processing in an aqueous medium is intended. Otherwise, the pigments of this invention can be used like existing pigments, that is, for example, for pigmenting plastics, paints or lacquers, but, in particular, also in toiletries and cosmetics.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A suspension of 60 g of potassium mica of the particle size fraction 10–70 μm in 2 liters of water is heated to 75° C. and adjusted to pH 2.2 by means of hydrochloric acid. A solution containing 15 percent by weight of $TiCl_4$, 5 percent by weight of HCl and, per liter, 20 g of $AlCl_3 \cdot 6 H_2O$ and a solution containing 15 percent by weight of NaOH and, per liter, 3.3 g of $SiO_2$ (as sodium silicate) are then simultaneously metered in, at rates and in amounts such that the pH is maintained at a constant value of 2.2. After the blue interference color desired has been reached, the coating step is discontinued, and the pigment is filtered off, dried at 120° C. and calcined for 30 minutes at 800° C.

The preparation has a deep blue interference color. Under the microscope, it can be seen that the surface of the platelets is smooth and free of cracks. The comparison of a lacquer foil of the preparation with that of a customary pigment demonstrates the clear, brilliant interference color, the high transparency and the low milkiness of the new pigment.

EXAMPLE 2

60 g of potassium mica of the particle size fraction 10–70 μm is coated analogously to Example 1 until a green interference color is reached, then separated off, dried and calcined.

In this case, too, the comparison with a commercially available preparation clearly shows the advantages of the new pigment.

EXAMPLE 3

Potassium mica of the particle size fraction 10 μm is coated analogously to Example 1. After a golden, red-blue and blue interference color has been reached, pigment samples are taken in each case, washed, dried and calcined.

In spite of the small particle size of the pigments, lacquer smears of the new pigments show very good color saturation and brilliance.

EXAMPLE 4

Pigment samples of various interference colors are prepared analogously to Example 3, but a potassium mica of the particle size fraction of about 5 μm is used. The lacquer smears of the new pigments show that very highly useful interference pigments are obtained even with this extemely fine particle size.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditons.

What is claimed is:

1. Nacreous pigments having improved transparency and tinctorial strength, comprising mica flakes whose surfaces are coated with a metal oxide layer wherein said metal oxide layer consists essentially of a homogeneous mixture of titanium dioxide, silicon dioxide and aluminum oxide.

2. Nacreous pigments of claim 1, wherein the metal oxide layer contains about 0.1 to about 20 percent by weight of $SiO_2$ and about 0.1 to about 20 percent by weight of $Al_2O_3$.

3. Nacreous pigments of claim 2 wherein, in the metal oxide layer, the amount of $SiO_2$ is about 1–10 percent by weight.

4. Nacreous pigments of claim 3 wherein, in the metal oxide layer, the amount of $Al_2O_3$ is about 0.2 to about 20 percent by weight.

5. Nacreous pigments of claim 4 of a particle diameter of 5–200 μm.

6. Nacreous pigments of claim 2 wherein, in the metal oxide layer, the amount of $Al_2O_3$ is about 0.2 to about 20 percent of weight.

7. Nacreous pigments of claim 2 wherein, in the metal oxide layer, the total amount of $SiO_2$ and $Al_2O_3$ is 0.2–30 percent by weight.

8. Nacreous pigments of claim 2 wherein, in the metal oxide layer, the total amount of $SiO_2$ and $Al_2O_3$ is 2–20 percent by weight.

9. A process for preparing nacreous pigments having improved transparency and tinctorial strength and comprising mica flakes whose surfaces are coated with a metal oxide layer wherein the metal oxide layer comprises a homogeneous mixture of titanium dioxide, silicon dioxide and aluminum oxide;

comprising coating mica flakes in an aqueous suspension of a pH of about 0.5–5 and a temperature of about 50°–100° C. by including in the suspension an amount of aluminum ions corresponding to the amount to be incorporated into the metal oxide layer and adding to the suspension two solutions at the same time, one a solution of a titanium salt providing an amount of titanium ions corresponding to the amount to be incorporated into the metal oxide layer and the other a basic solution effective to maintain said pH at an essentially constant value and containing an amount of solubilized $SiO_2$ corresponding to the amount to be incorporated into the metal oxide layer, uniformly co-precipitating onto the mica flakes titanium dioxide hydrate, silicon dioxide and aluminum hydroxide to form a uniform layer homogeneously containing said precipitated components, and then washing, drying and calcining the coated mica flakes.

10. A process of claim 9, wherein the total amount of silicon and aluminum components co-precipitated onto the mica flakes correspond to an amount of about 0.2 to about 30 percent by weight in total of $SiO_2$ and $Al_2O_3$ in the final calcined metal oxide layer.

11. A process of claim 9 wherein the aluminum is precipitated from a solution of aluminum chloride or aluminum sulfate, the titanium is precipitated from a solution of titanium chloride or titanium sulfate and the silicon is precipitated from a solution of an alkali metal silicate.

12. A process of claim 9 wherein the precipitation is effected by simultaneously adding to the acidic suspension of the mica platelets an acidic solution of titanium and aluminum.

13. A process of claim 12 wherein the solution of titanium and aluminum comprises $TiCl_4$ and $AlCl_3 \cdot 6 H_2O$ in a ratio of $TiCl_4:AlCl_3 \cdot 6 H_2O$ of about 50:1a to about 2:1 and the solution of silicon comprises an alkali metal silicate and NaOH in amounts such that the ratio of silicon as $SiO_2$ to NaOH is about 5:1 to about 400:1.

14. In a composition comprising a base ingredient and a pearlescent pigment based on $TiO_2$ coated mica flakes, the improvement wherein the mica flakes are nacreous pigments having improved transparency and tinctorial strength, comprising mica flakes whose surfaces are coated with a metal oxide layer wherein said metal oxide layer consists essentially of a homogeneous mixture of titanium dioxide, silicon dioxide and aluminum oxide.

15. A composition of claim 14 wherein the base ingredient is one useful for a plastic, lacquer, paint or cosmetic formulation.

* * * * *